US012666223B2

(12) United States Patent
Shin

(10) Patent No.: US 12,666,223 B2
(45) Date of Patent: Jun. 23, 2026

(54) LOCATION-AWARE ASSISTANT

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 204 days.

(21) Appl. No.: 18/387,398

(22) Filed: Nov. 6, 2023

(65) Prior Publication Data

US 2025/0150779 A1    May 8, 2025

(51) Int. Cl.
*H04W 4/021* (2018.01)
*G06F 40/40* (2020.01)
(52) U.S. Cl.
CPC ............ *H04W 4/021* (2013.01); *G06F 40/40* (2020.01)
(58) Field of Classification Search
CPC ............................... H04W 4/021; G06F 40/40
USPC ...................................................... 455/456.3
See application file for complete search history.

(56) References Cited

U.S. PATENT DOCUMENTS

| | | |
|---|---|---|
| 2006/0287748 A1 | 12/2006 | Layton et al. |
| 2017/0155725 A1* | 6/2017 | Rincon ............... H04L 12/1818 |
| 2019/0042182 A1 | 2/2019 | Thagadur Shivappa et al. |
| 2019/0050645 A1* | 2/2019 | Hentz .................... G06V 20/20 |
| 2020/0145778 A1* | 5/2020 | Laaksonen .............. H04S 7/304 |

| | | | |
|---|---|---|---|
| 2023/0267422 A1* | 8/2023 | Herman .................. G06F 3/013 |
| | | | 705/7.18 |
| 2025/0077794 A1* | 3/2025 | Mikhailiuk ............ G06V 20/46 |
| 2025/0166371 A1* | 5/2025 | Bose ....................... G10L 13/08 |

OTHER PUBLICATIONS

Jason Cohen, "Amazon's Alexa Collects More of Your Data Than Any Other Smart Assistant" PCMag. Retrieved from https://www.pcmag.com/news/amazons-alexa-collects-more-of-your-data-than-any-other-smart-assistant, 7 pages, dated Mar. 30, 2022.
Massai et al., "PAVAL: A location-aware virtual personal assistant for retrieving geolocated points of interest and location-based services" Engineering Applications of Artificial Intelligence 77, 70-85, dated 2019.

* cited by examiner

*Primary Examiner* — Hirdepal Singh
(74) *Attorney, Agent, or Firm* — Gray Ice Higdon

(57) ABSTRACT

Methods, systems, apparatus, including computer programs encoded on a computer storage medium, for spatialized audio feedback from automated assistants. In one aspect, the method includes actions of determining that a user input has been received at a client device, identifying, based on sensor data, one or more points of interest of an environment in which the client device is located and an orientation of a user of the client device relative to the one or more points of interest, identifying, based on processing the user input and the sensor data, a natural language response providing information relevant corresponds to a particular point of interest, determining, based on the orientation of the user of the client device relative to the particular point of interest, one or more spatial audio parameters to be used to provision the natural language response to the user, and causing the natural language response to be audibly rendered at the client device using one or more of the spatial audio parameters.

20 Claims, 5 Drawing Sheets

100

GPS
102-1

CLIENT
DEVICE
101

BT
102-2

UWB
102-3

NEURAL NETWORK
110

USER POSE
120

...
102-N

AUDIO SPATIALIZED POI
INFORMATION
CORRESPONDING
TO USER POSE
192

E-MAP
130

POINT OF INTEREST
(POI) IDENTIFIER
150

$\theta$
152

AUDIO SPATIALIZER
190

USER QUERY
140

POI INFORMATION
180

KNOWLEDGE SYSTEM
160

POI
154

INDEX
170

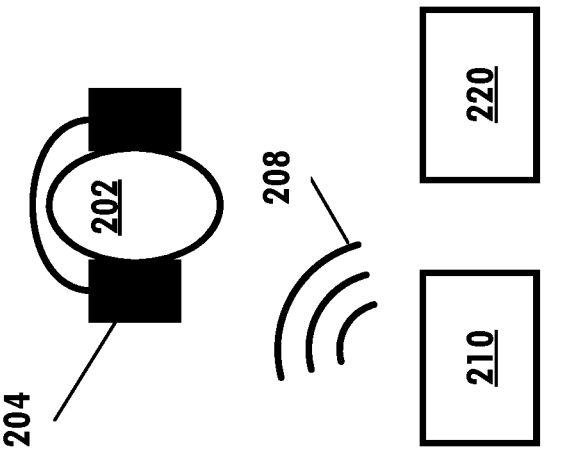
FIG. 2C
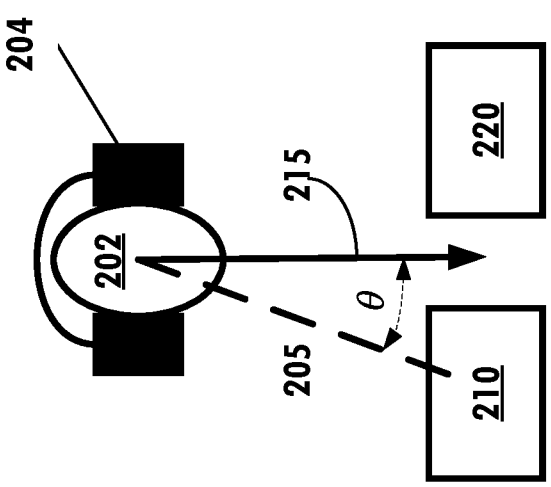
FIG. 2B
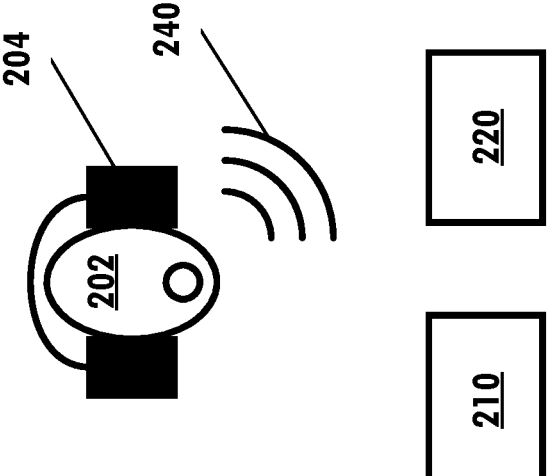
FIG. 2A

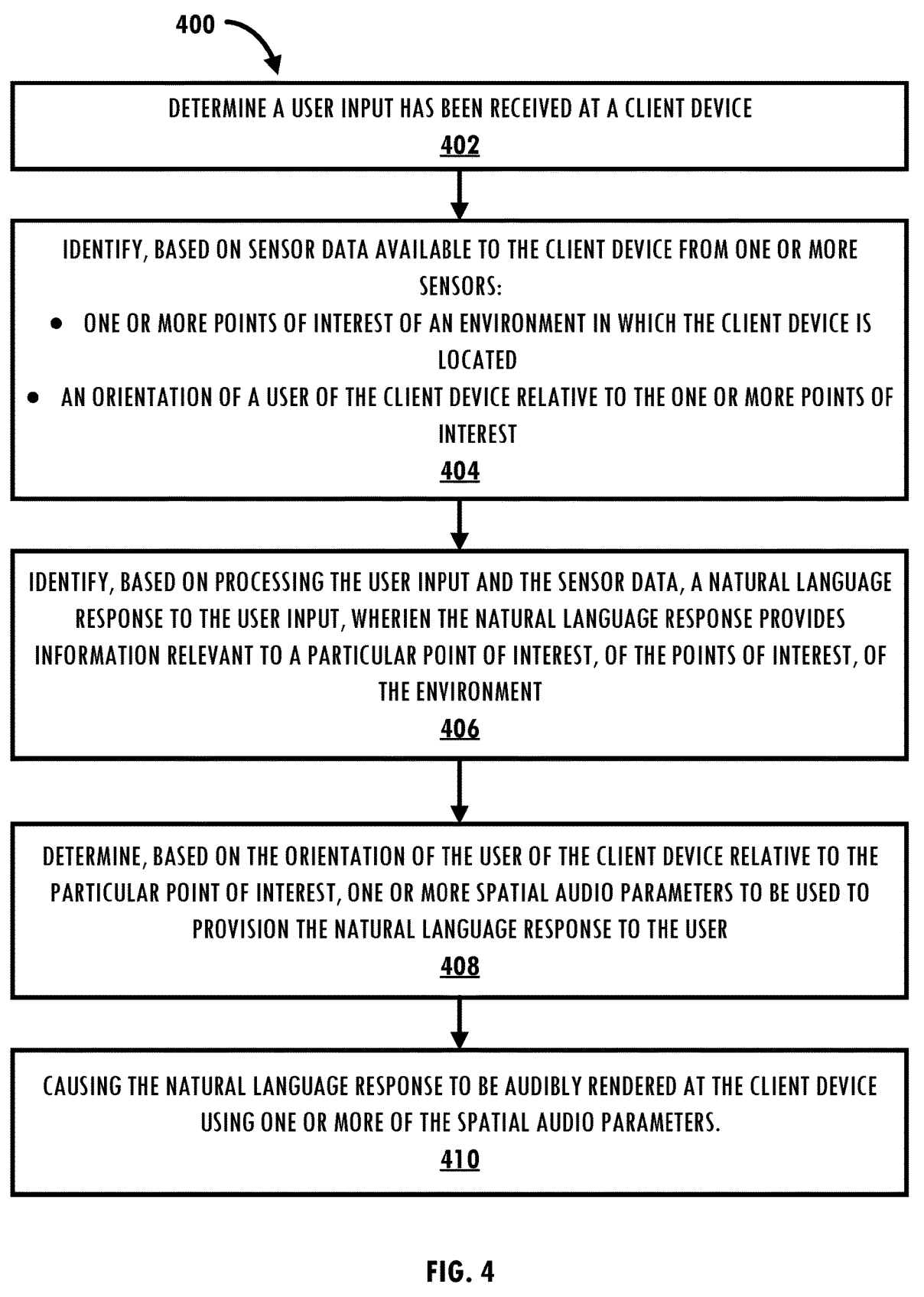

400

DETERMINE A USER INPUT HAS BEEN RECEIVED AT A CLIENT DEVICE
402

IDENTIFY, BASED ON SENSOR DATA AVAILABLE TO THE CLIENT DEVICE FROM ONE OR MORE SENSORS:
- ONE OR MORE POINTS OF INTEREST OF AN ENVIRONMENT IN WHICH THE CLIENT DEVICE IS LOCATED
- AN ORIENTATION OF A USER OF THE CLIENT DEVICE RELATIVE TO THE ONE OR MORE POINTS OF INTEREST
404

IDENTIFY, BASED ON PROCESSING THE USER INPUT AND THE SENSOR DATA, A NATURAL LANGUAGE RESPONSE TO THE USER INPUT, WHERIEN THE NATURAL LANGUAGE RESPONSE PROVIDES INFORMATION RELEVANT TO A PARTICULAR POINT OF INTEREST, OF THE POINTS OF INTEREST, OF THE ENVIRONMENT
406

DETERMINE, BASED ON THE ORIENTATION OF THE USER OF THE CLIENT DEVICE RELATIVE TO THE PARTICULAR POINT OF INTEREST, ONE OR MORE SPATIAL AUDIO PARAMETERS TO BE USED TO PROVISION THE NATURAL LANGUAGE RESPONSE TO THE USER
408

CAUSING THE NATURAL LANGUAGE RESPONSE TO BE AUDIBLY RENDERED AT THE CLIENT DEVICE USING ONE OR MORE OF THE SPATIAL AUDIO PARAMETERS.
410

FIG. 4

LOCATION-AWARE ASSISTANT

BACKGROUND

People interact with user devices to perform a variety of different tasks. User devices may include, for example, a smartphone, a smartwatch, a tablet computer, a smart speaker, a headset, a car, a television, a thermostat, etc. User devices may include hardware and software that are configured to enable "assistant" functionality. Assistant functionality may include at least partial performance of a task for a user by an automated assistant, which may alternatively be referred to as a "virtual assistant" or simply an "assistant." Tasks may include accessing application content, accessing information, communicating, ordering supplies, etc.

Assistant functionality may follow a query and response protocol in some implementations. Query and response protocol may dictate that when a user renders a query, an assistant may render a response to the query. For example, assistant functionality may include using a speech recognizer to an utterance by a user and perform natural language processing on speech-recognized text from the user's utterance to identify an operation that should be performed based on the query.

SUMMARY

The present disclosure is directed towards a system and method for spatialized audio stream feedback using one or more location-aware assistants.

Current assistant audio output (e.g., responses) may lack features that cause a response to be tailored to an environment of the user based on the user's pose. Therefore, current assistant responses may lack local context, and a point of interest in an environment may not be adequately identified. Current assistant audio responses may also lack features that cause a response to sound like it is coming from a point of interest in an environment based on user pose, as current assistant audio responses may lack spatial audio parameters and may be audibly head locked, e.g., rendered with monophonic audio which may always sound the same, no matter the user's pose relative to a point of interest.

Accordingly, spatialized responses tailored to an environment and a user pose may improve assistant functionality by creating a more immersive experience for a user. By identifying a point of interest based on user pose and spatializing an assistant response relevant to the point of interest based on user pose, the assistant response may be more relevant to the user and may be perceived as coming from the direction of a point of interest that the assistant response is relevant to. For instance, a user may perceive information about a particular vendor, identified based on at least user pose, as coming from the vendor, and therefore improve user immersion in the environment.

Embodiments of the subject matter described in this specification can be implemented so as to realize many advantages. For example, an advantage of providing spatialized responses tailored to an environment and a user pose is improved immersion of the user in an environment. For example, if a user says "what are the reviews for this restaurant" while maintaining a pose in an environment indicating that one restaurant is to the left of the user and another restaurant is to the right of the user, an automated assistant may leverage information relevant to the environment and the user pose to identify the restaurant on the left as a point of interest, and render a spatialized response tailored to the restaurant that can be perceived by the user as coming from the direction of the restaurant.

One advantage of user immersion may be at least partially attributed to assistant architecture identifying a user pose, a point of interest, electronic mappings (E-maps) and information related to the E-maps, synthesizing this data into point of interest information relevant to the user pose, and rendering audio feedback that includes information relevant to point of interest and with spatial audio parameters that are tailored to the user pose. Therefore, by combining the features of spatial audio parameters and point of interest information determined by a user pose and local mappings, user immersion is improved.

Techniques described herein also provide greater response accuracy. Greater response accuracy may be obtained by leveraging a user pose relative to E-maps and information related to E-maps. For example, current automated assistant functionality may include rendering a response about an object close to the user, as opposed to an object having a greater correlation with a user's pose overall, but which might otherwise be further away. Accordingly, assistant feedback leveraging information associated with a user pose in view of a relevant environment, as determined at least in part by E-maps, may result in a higher correlation with a point of interest of a user.

The present disclosure provides another advantage in the form of rendering spatialized audio responses based on information relevant to user pose and a relevant environment. Spatialized audio responses may enable a user to perceive an assistant response as coming from a direction of a point of interest in an environment, as opposed to being perceived as coming from a head locked audio source (e.g. rendered with monophonic audio which may be perceived as coming from the same place regardless of a user pose). For example, a response relevant to a restaurant may be rendered with greater accuracy based on information relevant to user pose and a relevant environment, and may further be rendered to be perceived by the user as coming from the restaurant based on user pose.

Additional advantages corresponding to the disclosure herein may include modifying a response based on user pose and/or characteristics of a user. For example, modifying a response may include increasing or decreasing volume based on a user pose relative to a perceived point of interest. Thus, if a user pose indicates that a user is close to an object, parameters including volume, echo, reverb, etc., may be increased or decreased to reflect this distance. Modifying a response may also include toggling unsolicited assistant responses based on user pose. For instance, if a user pose does not indicate that an object qualifies as a point of interest, assistant output including information about the object may be suppressed. As another example, if a user indicates that they do not wish to receive information from "digital barkers," e.g., modules deployed in buildings that are configured to provide unsolicited information to passersby, an assistant output relevant to the unsolicited information may not be rendered. More advantages associated with implementations of the disclosure herein will be appreciated.

Various aspects of the subject matter described in this specification can be embodied in methods that include: determining that a user input has been received at a client device; identifying, based on sensor data available to the client device from one or more sensors: one or more points of interest of an environment in which the client device is located, and an orientation of a user of the client device relative to the one or more points of interest; identifying, based on processing the user input and the sensor data, a natural language response to the user input, wherein the natural language response provides information relevant to a particular point of interest, of the points of interest, of the environment; determining, based on the orientation of the user of the client device relative to the particular point of interest, one or more spatial audio parameters to be used to provision the natural language response to the user; and causing the natural language response to be audibly rendered at the client device using one or more of the spatial audio parameters.

In various implementations, the sensors may include one or more of a geolocational position sensor, a gyroscopic sensor, and/or an accelerometer. In various implementations, identifying the orientation of the user may include determining a geolocation of the client device. In various implementations, identifying the one or more points of interest of the environment may include cross referencing the geolocation of the user with one or more landmarks contained in an electronic map of the environment.

In various implementations, the points of interest are associated with dynamic information corresponding to the landmarks. In various implementations, the dynamic information may include merchandise information, accessibility information, and/or historical information. In various implementations, the dynamic information is retrieved from a website, database, and/or application programming interface (API) created for the landmark.

In various implementations, the one or more spatial audio parameters comprise binauralized directional audio. In various implementations, the method may include: prior to identifying the one or more points of interest of the environment and orientation of the user relative to the points of interest: determining the user input is directed towards the environment.

In various implementations, the sensor data may include a distance between the user and the points of interest. In various implementations, identifying the natural language response may include: identifying the natural language response and one or more other natural language responses providing information relevant to other particular points of interest; ranking, based on the distance between the user and the particular point of interest and the other particular points of interest, the natural language response and the other natural language responses; and determining, based on the ranking, the natural language response satisfies criterion.

In various implementations, determining the spatial audio parameters may include: identifying preconfigured settings modified by the user corresponding to the audio spatialized features; and determining the audio spatialized features at least partially based on the preconfigured settings.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A is a contextual diagram of query time as implemented by architecture discussed herein.

FIG. 2B is a contextual diagram of localization time as implemented by architecture discussed herein.

FIG. 2C is a contextual diagram of response time as implemented by architecture discussed herein.

FIG. 4 is a flowchart depicting a process for rendering spatialized audio responses tailored to a point of interest based on at least a user pose.

DETAILED DESCRIPTION

Figure 1:
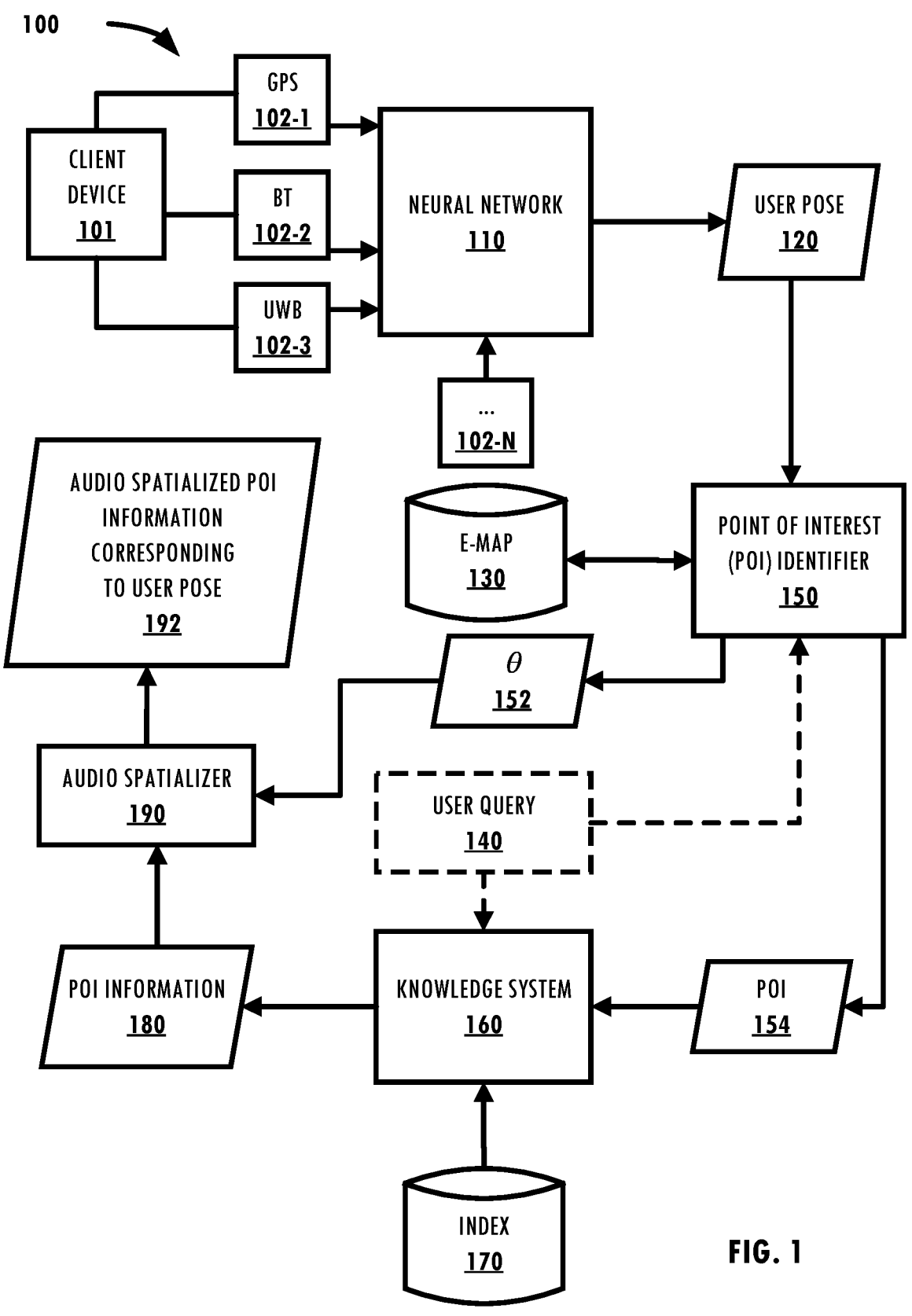
FIG. 1 is a block diagram of an example assistant architecture for implementing spatialized audio responses tailored to a point of interest based on information relevant to at least an environment and user pose.

FIG. 1 is a block diagram of an example architecture 100 for implementing spatialized responses tailored to a point of interest identified by a user's pose. Various elements depicted as part of architecture 100 in FIG. 1, which may be implemented using any combination of hardware or software, may be added, omitted, combined with other elements. FIG. 1 is a non-limiting example of an architecture 100 for carrying out selected aspects of the present disclosure.

Starting at top left, architecture 100 may include one or more inputs 102 being processed using neural network 110. One or more of the inputs 102 may be generated by sensors, such as sensors of a client device 101. These inputs may include, for instance, a Global Positioning System (GPS) input 102-1, a Bluetooth input 102-2, and/or an ultrawideband input 102-3, to name a few. Inputs 102 may provide information that is usable to determine a pose of a user (not depicted) of client device 101 relative to an environment. In some cases, user's pose may include one or more elements of what is often referred to as the "six degrees of freedom" (6DOF). For instance, a user's pose may include a user's geolocation (e.g., latitude and longitude, or "x and y"), elevation (e.g., z), pitch, yaw, and/or roll (e.g., orientation). The user's geolocation relative to an object in an environment may also be used to identify a distance and any occlusions between the user and the object. Accordingly, input 102 may correspond with information indicating a user pose relative to one or more objects in an environment.

Other inputs 102-N, such as inputs generated by client device 101 or other inputs generated elsewhere, may also be provided to the neural network 100, e.g., in addition to or instead of those described previously. For instance, other wireless signals that may or may not be available to client device 101 may include, but are not limited to, various types of cellular signals (e.g., LTE, 3G, 4G, 5G, and beyond), Wi-Fi, Zigbee, Z-Wave, and so forth. Another example of another input 102-N may be a peripheral device input. In some implementations, a peripheral device input may include information corresponding to user smart glasses, e.g., information corresponding to a user gaze. In some implementations, a peripheral device input may include information corresponding to a user input, such as a query or statement. In some implementations, a peripheral device input may include sensor data generated from sources such as a gyroscopic sensor and/or an accelerometer.

Inputs 102 may be propagated to neural network 100, which may be stored on and applied by client device 101, or may be stored on and applied by one or more remote servers (e.g., POI identifier 150, knowledge system 160, audio spatializer 190) that may form part of what is often referred to as "the cloud." Neural network 100 may generate, based on inputs 102, output indicative of a user pose 120. Various neural network models may be used, including but not limited to perceptrons, multilayer perceptrons, feed forward neural networks, convolutional neural networks, radial basis functional neural networks, recurrent neural networks, long short-term memory networks, sequence to sequence models, modular neural networks, and/or various types of transformer networks (e.g., encoder only, encoder-decoder, etc., some forms of which are often used as large language models, or "LLMs"), to name a few. Thus, neural network 100 may include any form and/or combination of neural network models. Neural network 110 may also include one or more hidden layers. Inputs 102 may be propagated to one or more hidden layers of neural network 110. Information corresponding to the one or more hidden layers of neural network 110 may be propagated to an output layer corresponding with at least user pose 120.

User pose 120 is an output generated using neural network 110 that may correspond to a user's geolocation and/or orientation (e.g., the 6DOF mentioned previously). In some implementations, user pose 120 may be expressed a vector, and may indicate a user gaze. Thus, by identifying a user pose, an assistant may be able to approximate what objects are in within a user's gaze. A user's pose 120 may also enable an assistant to provide spatialized audio output based on the user's pose 120. By identifying a user pose 120, an assistant may be able to provide audible output that is perceived by the user as coming from the direction of an object. However, an environment may include many objects, and not all objects necessarily qualify as points of interest of the user.

Not all inputs 102 are likely to be available at all times. While GPS 102-1 may be available so long as there is line of sight between client device 101 and GPS satellites, other inputs may only be available under certain circumstances. If a user carries client device 101 through a market, BT input 102-2 may be generated by client device 101 exchanging data with one or more Bluetooth beacons (e.g., at individual stores or stalls) as part of a discovery process in which Bluetooth devices are in advertising and/or scanning states. Similarly, Wi-Fi input may be generated by one or more Wi-Fi access points announcing their availability (e.g., including their login requirements). However, other inputs, such as UWB input 102-3, cellular data, etc., may not currently be available.

Accordingly, in various implementations, neural network 110 may be trained so that it is usable to generate user poses 120 with less than complete inputs. In some implementations, neural network 110 may be trained in stages. During initial training, neural network 110 may be trained using instances of training data that include snapshots where a client device had access to all potential inputs at once. In some implementations, these training instances may be labeled with a user's ground truth pose. Additionally or alternatively, in some implementations, the user may provide positive or negative feedback to the pose that is predicted for them (e.g., by the user rejecting or otherwise provided negative feedback to direction audio they receive). Whichever the case, neural network 110 may be trained using techniques such as gradient descent, back propagation, cross entropy, etc. After this initial training, neural network 110 may be capable of generating highly accurate user poses based on comprehensive sets of inputs 102.

During subsequent training stages of neural network 110, one or more inputs may be omitted from training instances, e.g., by being masked, left out, etc. For example, if neural network 110 has a predefined number of inputs for which data is expected, then those inputs for which actual data is unavailable may simply be nulled or zeroed out in training instance(s). As another example, if neural network 110 is capable of processing variable length sequences of tokens, as would be the case where neural network 110 is implemented as a transformer, then an input prompt may be assembled for each training instance with tokens for only those sensors that are generating data; inactive sensors may not be generating data, and therefore, no tokens may be incorporated into the input prompt on their behalf. As described previously, these training instances may be labeled with ground truth poses 120 and/or may include feedback on predicted user poses 120.

As training of neural network 110 progresses, more and more inputs may be omitted/masked. Consequently, neural network 110 may become increasingly capable of generating accurate user poses 120 in the absence of greater numbers of inputs. Eventually, neural network 110 may be capable of generating reasonably accurate user poses 120 that are "good enough" to be usable to implement directional audio responses as described herein. And in various implementations, neural network 110 may continue to be trained after deployment based on user feedback. For instance, if a user provides explicit or implicit negative feedback to directional audio (e.g., the user resubmits a user query 140 because the information they received was for the wrong point of interest, or came from the wrong direction), that feedback may be used to further train neural network 110.

Referring back to FIG. 1, point of interest (POI) identifier 150, which may be implemented wholly or partially on client device, or on one or more remote servers accessible to client device 101 over one or more networks (not depicted), may identify one or more POI 154 of a user based on at least user pose 120 and an E-map 130. POI 154 may be objects that are identified as being within an environment of the user and/or identified as relevant to user pose 120. POI 154 may be objects in an environment of a user identified as being of interest to the user. POI 154 may or may not pertain to known landmarks. For example, a POI 154 may include a structure, location, and/or other landmark or geographic feature which readily available information corresponds with. A POI 154 may also include an unknown structure, location, and/or person which readily available information does not correspond with. POI information 180, discussed in greater detail subsequently, may be affected by whether a POI 154 is known or unknown.

E-map 130 may be implemented and/or stored wholly or partially on client device 101 and/or on one or more remote server(s) accessible to client device 101. E-map 130 may include a database of candidate points of interest or other geographic features and corresponding geolocations. In some cases, E-map 130 may be used by applications such as mapping applications to render maps on display screens. In some such cases, these mapping applications may also use data in E-map 130 to provide directions to users, e.g., audibly and/or visually.

In some implementations, POI identifier 150, which may be implemented wholly or partially on client device, or on one or more remote servers accessible to client device 101 over one or more networks (not depicted), may identify a POI 154 of a user based on cross-referencing a geolocation of a user with one or more landmarks contained in E-map 130. For example, POI identifier 150 may recognize that a particular object, e.g. a national monument, store, person, etc., identified as a landmark in E-map 130, is relevant to user pose 120. POI identifier 150 may also provide theta (θ) 152 as an output, which may be used subsequently by audio spatializer 190. Theta 152 may correspond to an angle between a user's line of site indicated by user pose 120 and a POI 154. POI identifier 150 may also provide one or more POI 154 as an output.

As indicated by the dashed arrows in FIG. 1, in some implementations, POI 154 may also be identified based on a user query 140. For example, content of user query 140 could be used to disambiguate between two or more conflicting POIs 154 identified by POI identifier 150. Additionally or alternatively, one or more POIs 154 identified by POI identifier 150 may be used to disambiguate or otherwise resolve ambiguous terms contained in a query. For instance, if a user asks, "what's their special this evening?", a POI 154 indicating that the user is looking most directly towards a particular restaurant may be leveraged so that the term "their" is resolved to the particular restaurant.

In various implementations, a POI 154 identified by POI identifier 150 may be provided to knowledge system 160. Knowledge system 160 may identify information relevant to various objects, including the POI 154. In some implementations, knowledge system 160 may include a search engine (not depicted), and may identify POI information 180 by referencing index 170, which may include one or more search engine databases, websites, application programming interfaces (API), etc. In some implementations, knowledge system 160 may also search index 170 based on user query 140. For instance, knowledge system 160 may assemble an aggregate query that includes user query 140, POI 154, and index 170 to provide POI information 180. For example, if a user query 140 is provided, POI information 180 may include data that is responsive to an aspect of the user query 140.

Knowledge system 160, which may be implemented wholly or partially on client device, or on one or more remote servers accessible to client device 101 over one or more networks (not depicted), may identify information relevant to various objects based on one or more criterion. Knowledge system 160 criterion may include temporal relevance (e.g. if information is up-to-date), descriptiveness (e.g. if information is detailed), accuracy (e.g. if conflicting information is available), precision (e.g. quantity of resources available to verify information), etc.

POI information 180 may indicate information specifically relevant to POI 154, such as natural language output related to POI 154. As discussed herein, in some implementations, POI information 180 may include information that is also responsive to user query 140. For example, if POI information 180 corresponds with a specific store, and a user query 140 corresponds with a specific item that the stores sells, then POI information 180 may correspond with merchandise information associated with the specific item at the specific store.

POI information 180 may also include other information. Other information may include accessibility information, such as ADA compliance information, emergency information, and amenities, etc. Other information may also include historical information, such as relevant changes and historical events, etc. In some implementations, POI information 180 may include static information, e.g., information that is not frequently subject to change, and/or dynamic information, e.g., information that is frequently subject to change. In some implementations, POI information 180 may be ranked based on criterion such as relevancy, accuracy, time since last update, etc. Ranking may affect propagation of POI information 180 to audio spatializer 190, e.g., ranking may cause addition, removal, and/or modification of POI information 180 propagated to audio spatializer 190. POI information 180 may subsequently be provided to at least audio spatializer 190.

Audio spatializer 190, which may be implemented wholly or partially on client device, or on one or more remote servers accessible to client device 101 over one or more networks (not depicted), may generate spatialized audio parameters based on theta 152. In some implementations, spatialized audio parameters may include monaural directional parameters, and in some implementations spatialized audio parameters include binaural directional parameters. In some implementations, audio spatializer 190 may convolve POI 180 information with a nominal head-related transfer function (HRTF) to generate spatialized audio imitating an acoustical path corresponding to the HRTF. In some implementations, spatialized audio parameters may be at least partially based on preconfigured settings.

A preconfigured setting for spatialized audio parameters may indicate whether spatialized audio parameters should or should not be implemented to cause audio output to sound like it is coming from a particular direction, such as behind a user (e.g. one-hundred and eighty degrees opposite of a user's pose). In some implementations, based on preconfigured settings indicating that spatialized audio parameters should not be implemented to cause audio output to be perceived as coming from behind a user, audio spatializer 190 may generate spatialized audio relevant to a POI 154 that is behind a user by providing spatialized audio perceptible by the user as coming from a side, e.g. another angle, such as ninety degrees clockwise or counterclockwise relative to user pose 120. Spatialized audio generated to be perceived from a side of a user may gradually change to be perceived as coming from another direction corresponding with user pose 120 (e.g. a direction the user is oriented towards) as theta 152 between POI 154 and a user line of sight approaches zero degrees (e.g. a user's line of sight becomes approaches alignment with POI 154).

As discussed previously, theta 152 may correspond with an angle relevant to a user pose 120 and a point of interest 154 of the user. Theta 152 may be used by audio spatializer 190 to provide directional audio corresponding with POI 154, such that spatialized audio generated by audio spatializer 190 is perceived by a user as coming from the direction of the POI 154. For example, if theta 152 is one-hundred and eighty degrees clockwise (e.g. the POI 154 is directly behind a perceived line of sight of a user, based on user pose 120), and no preconfigured settings modify parameters of spatialized audio, audio spatializer 190 may generate audio that will be perceived by the user as coming from behind the user. As another example, if theta 152 is one-hundred and thirty-five degrees clockwise, audio spatializer 190 may generate audio that can be perceived by the user as coming from a rear right-hand side. Moreover, theta 152 may be two-dimensional or three-dimensional, such that audio spatializer 190 may also generate audio that can be perceived by a user as also coming from a higher or lower elevation, such as a forty-five degree incline. Audio spatializer 190 utilizes theta 152 and POI information 180 to produce audio spatialized POI information relevant to user pose 192.

Audio spatialized POI information relevant to user pose 192 may include audio data regarding a POI 154 that is spatialized to be perceived by a user as coming from the particular direction of the POI 154. For example, if a user's line of sight is parallel with the ground and aligned with a street having a vendor on the right side, and the vendor is perceived as being a POI 154, audio spatialized POI information relevant to user pose 192 and relevant to vendor (POI 154) on the right may be rendered so as to be perceived by the user as coming from the space of the vendor (POI 154) (e.g. from the right). As discussed herein, this may improve user immersion. Improvement in user immersion may be especially apparent relative to head locked systems, e.g., systems including audio output exclusively and/or primarily perceived by a user as coming from the same direction, regardless of user pose. POI information relevant to user pose 192 may be rendered for a user by a device having at least one speaker and/or other means of audio output.

As discussed herein, additions, removals, and/or modifications to aspects of architecture 100 of FIG. 1 may be implemented, e.g., on a continuous basis. For example, user feedback about audio spatialized POI information they received may be provided and used to determine, for instance, an error between the user's predicted pose and the user's "ground truth" indicated by the user's feedback. This error may be used to train neural network 110, e.g., using techniques such as back propagation and/or gradient descent.

Referring now to FIGS. 2A-2C, environment 200 is depicted. FIG. 2A depicts environment 200 during query time, e.g., the time in which a user input is received. FIG. 2A depicts a user 202 rendering an input 240 that is perceptible by an automated assistant associated with device 204. In some implementations, input 240 may be directed to one or more of objects 210 and 220 in or near the user's environment. During localization time, subsequently discussed with relation to FIG. 2B, object 210 and/or 220 may be identified as points of interest relevant to user input 240.

Input 240 is depicted as an audible input for illustrative purposes, however, input 240 may include any form of input that is perceptible by an automated assistant, including audible input, image input, haptic input, touch input, etc., and any combination thereof. Accordingly, in some embodiments, input 240 may include touch input to a keyboard along with or instead of an audible input. Input 240 may implicitly or explicitly provide an indication of a point of interest of a user. Accordingly, input 240 may indicate that user 202 wants to know which store corresponds with aspects such as a restroom or certain merchandise, etc., and based on at least input 240, a store corresponding with those aspects will be identified as a point of interest.

FIG. 2B depicts environment 200 during localization time, e.g., the time in which a user's gaze direction 215 is localized and used to determine a point of interest. During localization time depicted in FIG. 2B, device 204 may process input 240 (corresponding to user query 140), along with other available inputs (e.g., 102-1, 102-2, . . . , 102-N), such as GPS signals, Bluetooth signals, Wifi signals, Ultrawideband signals, peripheral signals (e.g. gyroscopic, accelerometer, pressure transducers), etc., to identify a user gaze direction 215 in environment 200. In some implementations, user gaze direction 215 may be expressed as a vector. For illustrative purposes, FIG. 2B depicts user gaze direction 215 as a vector including at least directional and/or distance components.

In some implementations, user gaze direction 215 may be directly related to one or more objects in environment 200, such as object 210 and/or object 220. In some implementations user gaze direction 215 may not directly relate to one or more objects in environment 200, e.g. user gaze direction 215 may indicate a user's line of sight is askew of object 210 and/or object 220, and/or user gaze direction 215 may indicate a user's line of sight is completely void of object 210 and/or object 220. Accordingly, user gaze direction 215 may be leveraged with user input 240 to identify if object 210 and/or 220 is a point of interest. In some implementations, one or more permutations of ranking may be implemented in identifying object 210 and/or object 220 as a point of interest.

Based on processing user input 240 and user gaze direction 215, device 204 may identify object 210 as a point of interest. As discussed in relation to FIG. 1, processing input 240 and other information (e.g. signals) to identify a user gaze direction 215 may include processing input 240 and the other information using a neural network (110 in FIG. 1). Device 204 may further identify an angle theta $\theta$ relating to a user's gaze direction 215 relative to object 210. Like user gaze direction 215, FIG. 2B depicts POI pose 205 as a vector that includes directional and/or distance components.

In some implementations, user input 240 may be audibly rendered towards object 220, e.g. user 202 may provide spoken input 240 in the direction of object 220, however despite this, based on processing user input 240 and user gaze direction 215, device 204 may identify object 210 as a point of interest. For example, object 210 may be a restaurant serving gyros and object 220 may be a restaurant serving burgers, and based on user input 240 including a spoken utterance of "what is the best gyro on the menu", device 204 may identify object 210 as the point of interest despite user input 240 being rendered by the user 202 in the direction of object 220 and user gaze direction 215 relating to each object 210/220 relatively equally.

FIG. 2C depicts environment 200 during response time, e.g. the time in which a response relating to a POI is received.

FIG. 2C illustrates output 208 being rendered for user 202. Output 208 may be rendered based on one or more of input 240, user gaze direction 215, the angle theta $\theta$ between the user's gaze direction 215 and object 210, and identification of object 210 being a point of interest.

Content of output 208 may be based on a variety of factors, such as user input 240 and object 210, etc. Using the previous example of "what is the best gyro on the menu", output 208 may include information generally relating to object 210, which in this example is a restaurant serving gyros (e.g. "Handcrafted Gyros has a number highly rated menu items . . . "), and may specifically relate to user input 240 (e.g. " . . . menu items including their good gyro, their better gyro, and their best gyro").

Moreover, output 208 may be audibly rendered using spatial audio parameters discussed herein to be perceived by user 202 as coming from object 210, which in this example is the restaurant "Handcraft Gyros". Based on user gaze direction 215, and/or angle theta $\theta$ between user gaze direction 215 and object 210, device 204 may render and/or cause to be rendered an output 208 that is perceptible by user 202 as coming from object 210. For example, based on angle theta $\theta$ indicating that a user's line of sight is forty-five degrees clockwise of object 210 (e.g. "Handcrafted Gyros"), device 204 may render output 208 with spatial audio parameters corresponding to the forty-five degree clockwise angle, such that output 208 is perceived by user 202 as coming from a direction that is forty-five degrees clockwise of the user's gaze direction 215, e.g., front and slightly to the right.

As discussed herein, angle theta may correspond with a three-dimensional angle, and may also include aspects corresponding with elevation, such that if object 210 is elevated relative to the user, e.g., on the third story of a building or on a billboard that is thirty degrees above a user's gaze direction 215, output 208 may sound like it is coming from thirty degrees higher than the user 202.

In some implementations, output 208 may be audibly rendered with spatial audio parameters to be perceived by user 202 as coming from a particular point of object 210, such as a front entrance of a restaurant, "Handcrafted Gyros". Spatial audio parameters may also include volume, reverb, echo, etc. In some implementations output 208 may be rendered using spatial audio parameters to be perceived by user 202 as coming from a center of object 210, regardless of a floor layout of "Handcrafted Gyros". Still yet, in some implementations, output 208 may be rendered using spatial audio parameters to be perceived by user 202 as coming from a portion of object 210 that is in user 202's gaze direction 215.

Rendering output 208 with spatial audio parameters may also include adjusting volume based on user gaze direction 215 and a position of object 210 relative to the user. For example, if a distance between user 202 and object 210 is one-hundred feet, a volume corresponding to output 208 may be increased or decreased to a first level. If a distance between user 202 and object 210 is ten feet, a volume corresponding to output 208 may be increased or decreased to a second level. Accordingly, in addition to spatial audio parameters causing output 208 to be perceived by user 202 as coming from a particular direction, spatial audio parameters may cause output 208 to be perceived by user 202 as coming from a particular distance.

In some implementations, query time of FIG. 2A may be skipped, and output 208 may be rendered without regards to a user input 240. For example, device 204 may identify, without user input 240, object 210 and/or object 220 as being a point of interest based on criterion. The criterion may include user information (e.g. momentum, distance, direction, historical data), object information (e.g. any static and dynamic information), and/or correlations between the user information and the object information, etc. For example, user information may indicate that user 202 likes gyros, and device 204 may identify object 210, a restaurant that serves gyros (e.g. "Handcrafted Gyros"), as being a point of interest despite user 202 not rendering an input 240, much less an input 240 related to gyros. Output 208 may also provide additional information, such as an indication that output 208 was provided based on historical information or marketing campaigns. For example, user device 204 may render, or cause to be rendered, output 208 "Handcrafted Gyros has a number of highly rated menu items including their good gyro, their better gyro, and their best gyro. This content was provided based on your historical interest in gyros", and output 208 may be rendered without user 202 rendering an input 240.

Figure 3:
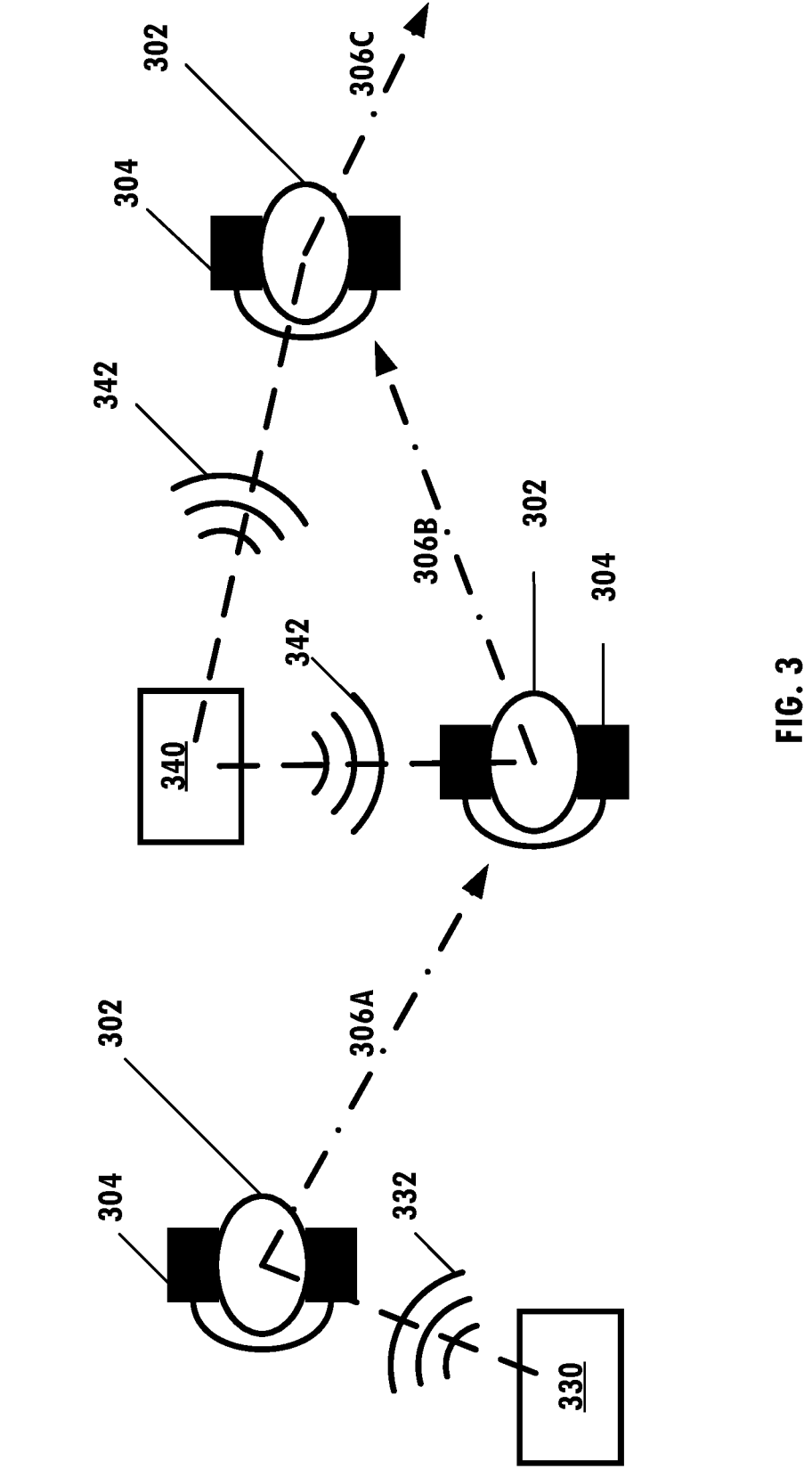
FIG. 3 is a contextual diagram depicting assistant renderings relevant to unsolicited and/or dynamic spatialized audio responses.

FIG. 3 depicts user 302 traveling through environment 300 and receiving unsolicited outputs 332 and 342 from objects 330 and 340, respectively. As discussed herein, data associated with user 302 and/or user device 304 may be used to identify user 302 as having a pose in environment 300 and being in a vicinity of objects 330 and 340. A user's pose may be static (e.g. corresponding to complete standstill) or be dynamic (e.g. corresponding to a user travelling along a trajectory including a plurality of points and/or rotating about one or more points).

For example, device 304 may identify user 302 as travelling along trajectory 306A in a first instance and passing within a vicinity of object 330, which may be a store. Device 304 may identify object 330 as a point of interest based on criterion, such as user information, object information, device settings, etc. Based on device 304 identifying object 330 as a point of interest, device 304 may render output 332 relating to object 330. For example, if object 330 is a vendor, output 332 may relate to sales, promotions, and inventory of the vendor. Output 332 may include spatial audio parameters disclosed herein, such as spatial audio parameters causing user 304 to perceive output 332 as coming from the direction of object 330 and/or coming from a distance between user 302 and object 330.

As user 302 travels along trajectory 306A, user 302 may approach a vicinity of object 340. Device 304 may also identify object 340 as a point of interest. However, object 340 may relate to information having a durational length that may complicate rendering of spatial audio parameters of output 342. For example, user 302 traveling along trajectory 306B may result in spatial audio parameters of output 342 becoming stale (e.g. a pose of user 302 may change relative to object 340 between the start and end of trajectory 306B). In some implementations, as user 302 is travelling along trajectory 306B, spatial audio parameters of output 342 may change.

For example, at a first instance of a user 302's travel along trajectory 306B, directly after user ceases traveling along trajectory 306A, device 304 may render output 342 for user 302 with spatial audio parameters that user 302 may perceive as coming from ninety degrees counterclockwise (e.g. user 302's left side) and that user 302 may perceive as coming from nearby (e.g. having a volume corresponding to twenty feet away). At a second instance of user 302's travel along trajectory 306B, right before user 302 begins travel along trajectory 306C, device 304 may render output 342 with spatial audio parameters that user 302 may perceive as coming from one-hundred and seventy degrees counterclockwise (e.g. user 302's rear left side) and that user 302 may perceive as coming from further away (e.g. having a volume corresponding to 30 feet away). Accordingly, the spatial audio parameters of output 342 may correspond with a plurality of iterations related to a dynamic pose of user 302.

In some implementations, rendering outputs 332 and 342 is not mutually exclusive. For example, a plurality of outputs relating to a plurality of objects in an environment may be simultaneously rendered with spatial audio parameters. For example, while output 332 is being rendered with spatial audio parameters which may cause a user to perceive output 332 as coming from a direction and/or distance corresponding with object 330, output 342 may be concurrently rendered with spatial audio parameters which may cause a user to simultaneously perceive output 342 as coming from a direction and/or distance corresponding with object 340. Thus, user 302 may perceive output 332 as coming from object 330 and output 342 as coming from object 340 at the same time.

In some implementations, spatial audio parameters may be controlled by a user. For example, user 302 may prefer to not receive spatialized output from behind. Accordingly, user 302 may adjust settings on device 304 to disable spatialized output relating to objects behind user 302. Alternatively, as discussed herein, user 302 may also adjust settings on device 304 to modify spatialized output relating to objects behind user 302, such that user 302 may perceive output as coming from a side until user 302 rotates their pose to substantially align a user's gaze with the object formerly behind user 302. Still yet, user 302 may also adjust settings on device 302 to disable spatialized output relating to objects from behind user 302, but enable non-spatialized output (e.g. output that user 302 would perceive as coming from a speaker or headset, as opposed to an object the output relates to). Moreover, user 302 may also adjust various volume settings relating to outputs, how many outputs may be rendered at a time, and environments in which outputs should not be rendered (e.g. by way of elaborating on what qualifies as a point of interest, or by elaborating where in an environment it is appropriate to render an output).

Aspects discussed herein may be implemented in various ways. For example, aspects discussed herein may be implemented in methods executed by one or more processors, systems including one or more processors, and/or non-transitory computer readable media including one or more processors. Accordingly, FIG. 4 depicts a block diagram of an example method 400. One or more operations of FIG. 4 may be added, omitted, combined with other operations, etc.

FIG. 4 depicts method 400 as beginning with block 402. In block 402 a determination is made that a user input has been received at client device. As disclosed herein, a user input may include a query, a statement, a haptic input, a touch input, and/or any other form of input. As noted above with regard to FIG. 3, in other implementations, it is not necessary for the user to provide explicit or deliberate input to receive spatialized audio output as described herein.

Subsequent to determining that a user input has been received at the client device in block 402, at block 404 the system, e.g., by way of POI identifier 150, may identify, based on sensor data available to the client device from one or more sensors: (i) one or more points of interest of an environment in which the client device is located, and (ii) an orientation of a user of the client device relative to the one or more points of interest. In various implementations, the one or more sensors may include, for instance, a geolocational position sensor (e.g., GPS), various wireless signals described previously in relation to inputs 102 (e.g., UWB, Bluetooth, Wi-Fi, etc.), a gyroscopic sensor, and/or an accelerometer, to name a few. In some implementations, identifying an orientation of a user may include determining a geolocation of the client device. In some implementations, identifying one or more points of interest of an environment may include cross referencing a geolocation of a user with one or more landmarks contained in an electronic map of the environment.

At block 406, the system, e.g., by way of knowledge system 160, identifies, based on processing the user input and the sensor data, a natural language response to the user input. In various implementations, the natural language response provides information relevant to a particular point of interest, of the points of interest, of the environment.

In some implementations, the user's pose maybe used to determine a distance between a user and a point of interest. In some such implementations, multiple candidate natural language responses providing information relevant to multiple points of interest may be identified. In some implementations, these multiple candidate natural language responses may be ranked based on distances between the user and the multiple points of interest. A determination may then be may, based on the ranking, that one of the natural language responses satisfies one or more criteria, such as being the highest ranked. Moreover, in some implementations a plurality of natural language responses may satisfy criterion and be rendered. Accordingly, a user may perceive multiple natural language responses consecutively or currently.

At block 408, the system, e.g., by way of audio spatializer 190, determines, based on the orientation of the user of the client device relative to the particular point of interest, one or more spatial audio parameters to be used to provision the natural language response to the user. In some implementations, a user may configure settings to adjust audio spatial parameters. Accordingly, in some implementations, determining the spatial audio parameters includes identifying preconfigured audio spatial parameters modified by the user and determining the audio spatialized parameters at least partially based on the preconfigured settings.

At block 410, the system, e.g., by way of client device 101, may cause the natural language response to be audibly rendered at the client device using one or more of the spatial audio parameters. In some implementations, the spatial audio parameters determined at block 408 and used at block 410 may cause the user to perceive the natural language response as though it is rendered from the direction of a point of interest. Additionally or alternatively, in some implementations, the spatial audio parameters may cause the user to perceive the natural language response as though it is rendered from a distance corresponding with the distance between the user and a point of interest. Accordingly, spatial audio parameters may correspond with a multidimensional vector and/or angle relevant to at least a pose of a user and/or a pose of a point of interest.

Figure 5:
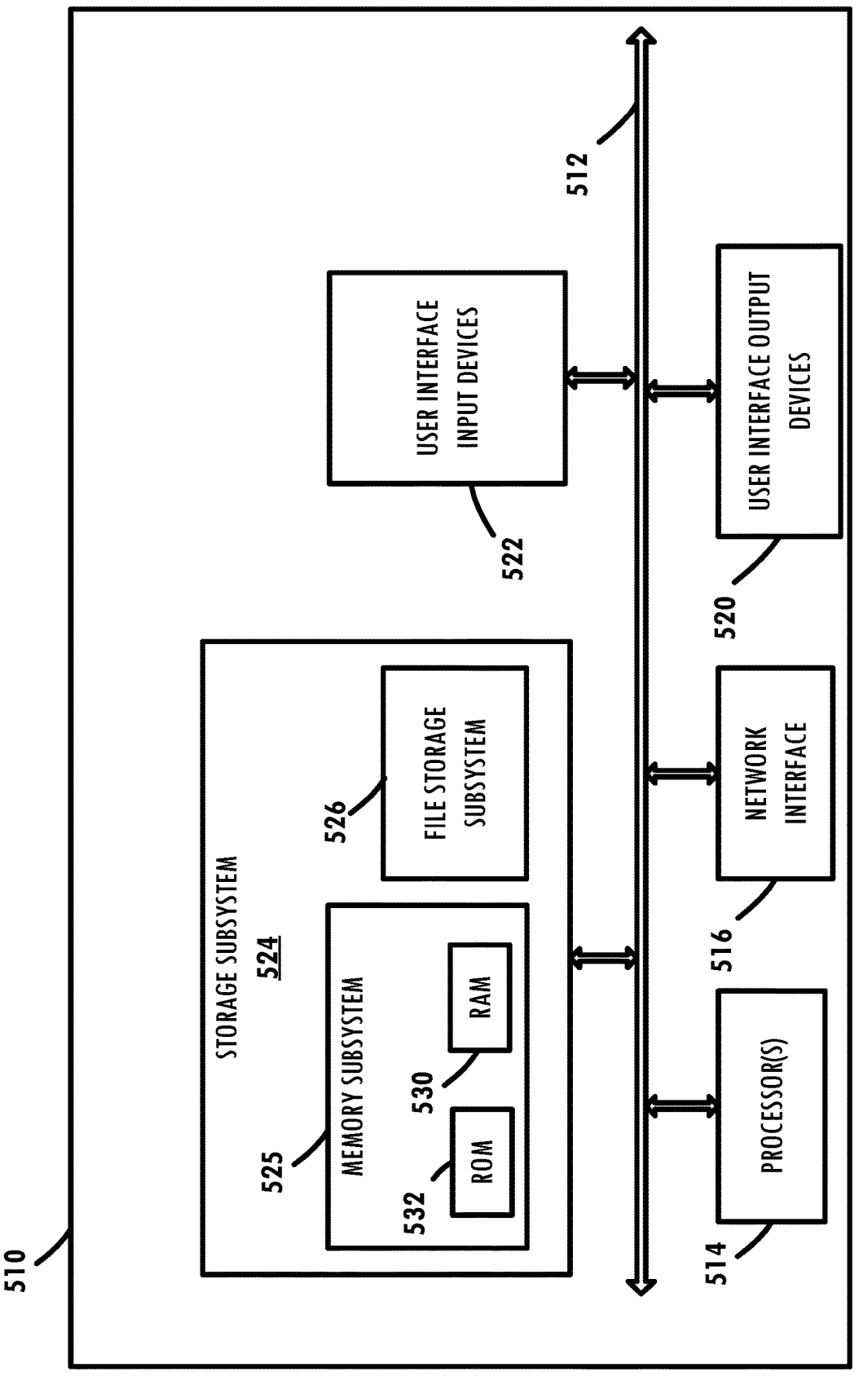
FIG. 5 is a diagram of computing architecture which may facilitate execution of aspects of the disclosure presented herein.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method depicted in FIG. 4, as well as to implement various aspects depicted in FIGS. 1-3.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A computer-implemented method, the method comprising:
  determining that a user input has been received at a client device;
  identifying, based on sensor data available to the client device from one or more sensors:

one or more points of interest of an environment in which the client device is located, wherein identifying the one or more points of interest of the environment comprises cross referencing a geolocation of the client device with one or more landmarks contained in an electronic map of the environment, and
    the points of interest are associated with dynamic information corresponding to the landmarks,
      wherein the dynamic information comprises merchandise information; and
  identifying an orientation of a user of the client device relative to the one or more points of interest,
    wherein identifying the orientation of the user comprises determining the geolocation of the client device;
  identifying, based on processing the user input and the sensor data, a natural language response to the user input, wherein the natural language response provides information relevant to a particular point of interest, of the points of interest, of the environment;
  determining, based on the orientation of the user of the client device relative to the particular point of interest, one or more spatial audio parameters to be used to provision the natural language response to the user; and
  causing the natural language response to be audibly rendered at the client device using one or more of the spatial audio parameters.

2. The method of claim 1, wherein the dynamic information is retrieved from a website, database, and/or application programming interface (API) created for the landmarks.

3. The method of claim 1, wherein the one or more spatial audio parameters comprise binauralized directional audio.

4. The method of claim 1, further comprising:
  prior to identifying the one or more points of interest of the environment and orientation of the user relative to the points of interest:
    determining the user input is directed towards the environment.

5. The method of claim 1, wherein the one or more spatial audio parameters further comprise at least one of volume, reverb, or echo parameters adjusted based on the orientation and a distance between the user and the particular point of interest.

6. A computer-implemented method, the method comprising:
  determining that a user input has been received at a client device;
  identifying, based on sensor data available to the client device from one or more sensors:
  one or more points of interest of an environment in which the client device is located, wherein identifying the one or more points of interest of the environment comprises cross referencing a geolocation of the client device with one or more landmarks contained in an electronic map of the environment, and
    the points of interest are associated with dynamic information corresponding to the landmarks
      wherein the dynamic information comprises accessibility information; and
  identifying an orientation of a user of the client device relative to the one or more points of interest,
    wherein identifying the orientation of the user comprises determining the geolocation of the client device;
  identifying, based on processing the user input and the sensor data, a natural language response to the user input, wherein the natural language response provides information relevant to a particular point of interest, of the points of interest, of the environment;

determining, based on the orientation of the user of the client device relative to the particular point of interest, one or more spatial audio parameters to be used to provision the natural language response to the user; and causing the natural language response to be audibly rendered at the client device using one or more of the spatial audio parameters.

7. The method of claim 6, wherein the dynamic information is retrieved from a website, database, and/or application programming interface (API) created for the landmarks.

8. The method of claim 6, wherein the one or more spatial audio parameters comprise binauralized directional audio.

9. The method of claim 6, further comprising:

prior to identifying the one or more points of interest of the environment and orientation of the user relative to the points of interest:

determining the user input is directed towards the environment.

10. A computer-implemented method, the method comprising:

determining that a user input has been received at a client device;

identifying, based on sensor data available to the client device from one or more sensors:

one or more points of interest of an environment in which the client device is located, wherein identifying the one or more points of interest of the environment comprises cross referencing a geolocation of the client device with one or more landmarks contained in an electronic map of the environment, and the points of interest are associated with dynamic information corresponding to the landmarks wherein the dynamic information comprises historical information; and identifying an orientation of a user of the client device relative to the one or more points of interest, wherein identifying the orientation of the user comprises determining the geolocation of the client device;

identifying, based on processing the user input and the sensor data, a natural language response to the user input, wherein the natural language response provides information relevant to a particular point of interest, of the points of interest, of the environment;

determining, based on the orientation of the user of the client device relative to the particular point of interest, one or more spatial audio parameters to be used to provision the natural language response to the user; and causing the natural language response to be audibly rendered at the client device using one or more of the spatial audio parameters.

11. The method of claim 10, wherein the sensors comprise one or more of a geolocational position sensor, a gyroscopic sensor, and/or an accelerometer.

12. The method of claim 10, wherein the dynamic information is retrieved from a website, database, and/or application programming interface (API) created for the landmarks.

13. The method of claim 10, wherein the one or more spatial audio parameters comprise binauralized directional audio.

14. The method of claim 10, further comprising:

prior to identifying the one or more points of interest of the environment and orientation of the user relative to the points of interest:

determining the user input is directed towards the environment.

15. A computer-implemented method, the method comprising:

determining that a user input has been received at a client device;

identifying, based on sensor data available to the client device from one or more sensors:

one or more points of interest of an environment in which the client device is located, and an orientation of a user of the client device relative to the one or more points of interest, wherein the sensor data comprises a distance between the user and the points of interest;

identifying, based on processing the user input and the sensor data, a natural language response to the user input, wherein the natural language response provides information relevant to a particular point of interest, of the points of interest, of the environment and wherein identifying the natural language response comprises:

identifying the natural language response and one or more other natural language responses providing information relevant to other particular points of interest;

ranking, based on the distance between the user and the particular point of interest and the other particular points of interest, the natural language response and the other natural language responses; and determining, based on the ranking, the natural language response satisfies criterion;

determining, based on the orientation of the user of the client device relative to the particular point of interest, one or more spatial audio parameters to be used to provision the natural language response to the user; and causing the natural language response to be audibly rendered at the client device using one or more of the spatial audio parameters.

16. A computer-implemented method, the method comprising:

determining that a user input has been received at a client device;

identifying, based on sensor data available to the client device from one or more sensors:

one or more points of interest of an environment in which the client device is located, and an orientation of a user of the client device relative to the one or more points of interest;

identifying, based on processing the user input and the sensor data, a natural language response to the user input, wherein the natural language response provides information relevant to a particular point of interest, of the points of interest, of the environment;

determining, based on the orientation of the user of the client device relative to the particular point of interest, one or more spatial audio parameters to be used to provision the natural language response to the user, wherein determining the spatial audio parameters comprises:

identifying preconfigured settings modified by the user corresponding to the spatial audio parameters; and determining the spatial audio parameters at least partially based on the preconfigured settings; and causing the natural language response to be audibly rendered at the client device using one or more of the spatial audio parameters.

17. A system comprising one or more processors and memory storing instructions that, in response to execution by the one or more processors, cause the one or more processors to:

determine that a user input has been received at a client device;

identify, based on sensor data available to the client device from one or more sensors:

one or more points of interest of an environment in which the client device is located, wherein identifying the one or more points of interest of the environment comprises cross referencing a geolocation of the client device with one or more landmarks contained in an electronic map of the environment, and the points of interest are associated with dynamic information corresponding to the landmarks, wherein the dynamic information comprises merchandise information; and identify an orientation of a user of the client device relative to the one or more points of interest, wherein identifying the orientation of the user comprises determining the geolocation of the client device;

process the user input and the sensor data to identify a natural language response to the user input, wherein the natural language response provides information relevant to a particular point of interest, of the points of interest, of the environment;

determining, based on the orientation of the user of the client device relative to the particular point of interest, one or more spatial audio parameters to be used to provision the natural language response to the user; and causing the natural language response to be audibly rendered at the client device using one or more of the spatial audio parameters.

18. The system of claim 17, wherein the sensors comprise one or more of a geolocational position sensor, a gyroscopic sensor, and/or an accelerometer.

19. A system comprising one or more processors and memory storing instructions that, in response to execution by the one or more processors, cause the one or more processors to:

determine that a user input has been received at a client device;

identify, based on sensor data available to the client device from one or more sensors:

one or more points of interest of an environment in which the client device is located, wherein identifying the one or more points of interest of the environment comprises cross referencing a geolocation of the client device with one or more landmarks contained in an electronic map of the environment, and the points of interest are associated with dynamic information corresponding to the landmarks, wherein the dynamic information comprises accessibility information; and identify an orientation of a user of the client device relative to the one or more points of interest, wherein identifying the orientation of the user comprises determining the geolocation of the client device;

process the user input and the sensor data to identify a natural language response to the user input, wherein the natural language response provides information relevant to a particular point of interest, of the points of interest, of the environment;

determining, based on the orientation of the user of the client device relative to the particular point of interest, one or more spatial audio parameters to be used to provision the natural language response to the user; and causing the natural language response to be audibly rendered at the client device using one or more of the spatial audio parameters.

20. The system of claim 19, wherein the sensors comprise one or more of a geolocational position sensor, a gyroscopic sensor, and/or an accelerometer.

\* \* \* \* \*